United States Patent [19]
Getzin

[11] 3,966,163
[45] June 29, 1976

[54] FILTER RETAINING LATCH

[75] Inventor: Allan R. Getzin, Louisville, Ky.

[73] Assignee: American Air Filter Company, Inc., Louisville, Ky.

[22] Filed: May 28, 1974

[21] Appl. No.: 473,378

[52] U.S. Cl. ............................ 248/500; 24/261 R; 55/504; 55/509; 292/80
[51] Int. Cl.² .................. B01D 39/08; B65D 45/24
[58] Field of Search ........ 24/243 AB, 243 P, 243 C, 24/243 WC, 243 G, 255 AS, 255 S, 261 R, 261 A, 261 D, 30; 55/502, 504, 509; 292/80, 87, 88, 89; 248/509, 499, 500; 211/41; 210/232

[56] References Cited
UNITED STATES PATENTS

| | | | |
|---|---|---|---|
| 2,065,970 | 12/1936 | Hartzell | 55/509 |
| 2,771,155 | 11/1956 | Palmore | 55/509 |
| 2,920,915 | 1/1960 | Ducharme et al. | 292/87 |

*Primary Examiner*—Paul R. Gilliam
*Attorney, Agent, or Firm*—Jon C. Winger

[57] ABSTRACT

A coiled latch for locating and holding a filter in a housing has two coaxially disposed turns preferably in the form of a conical helix, the smaller of the turns exerts a force on the filter holding it into the housing, while the larger of the turns abuts the peripheral margin of the filter to center it in the housing.

2 Claims, 6 Drawing Figures

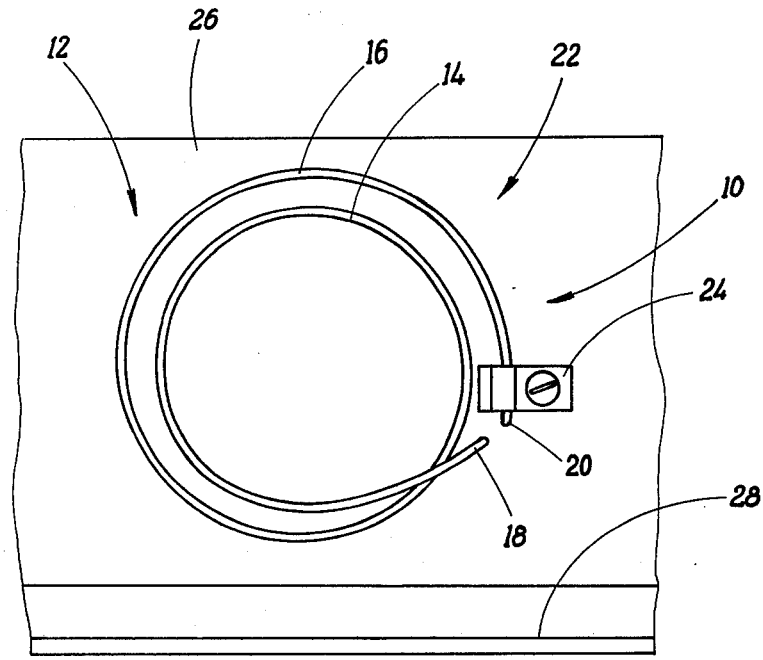
Fig. 1
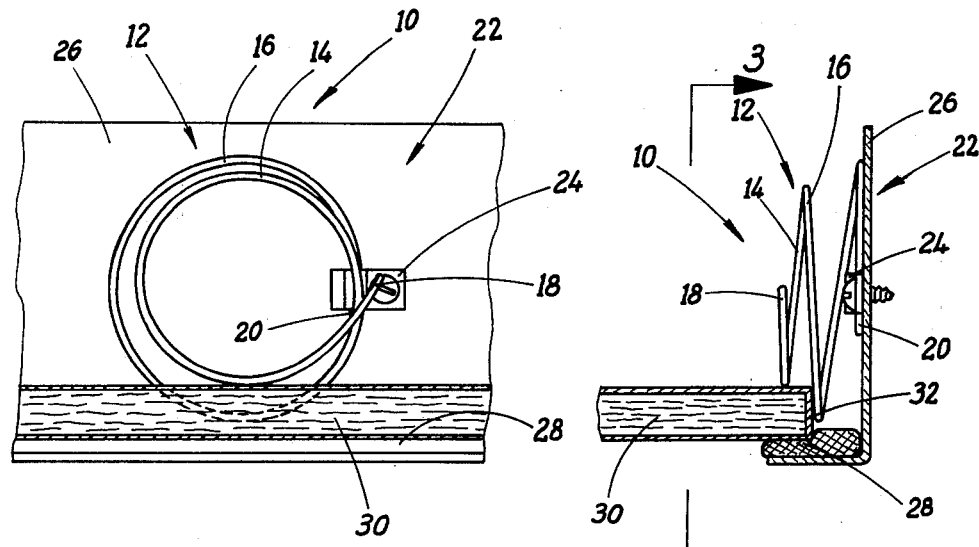
Fig. 3
Fig. 2

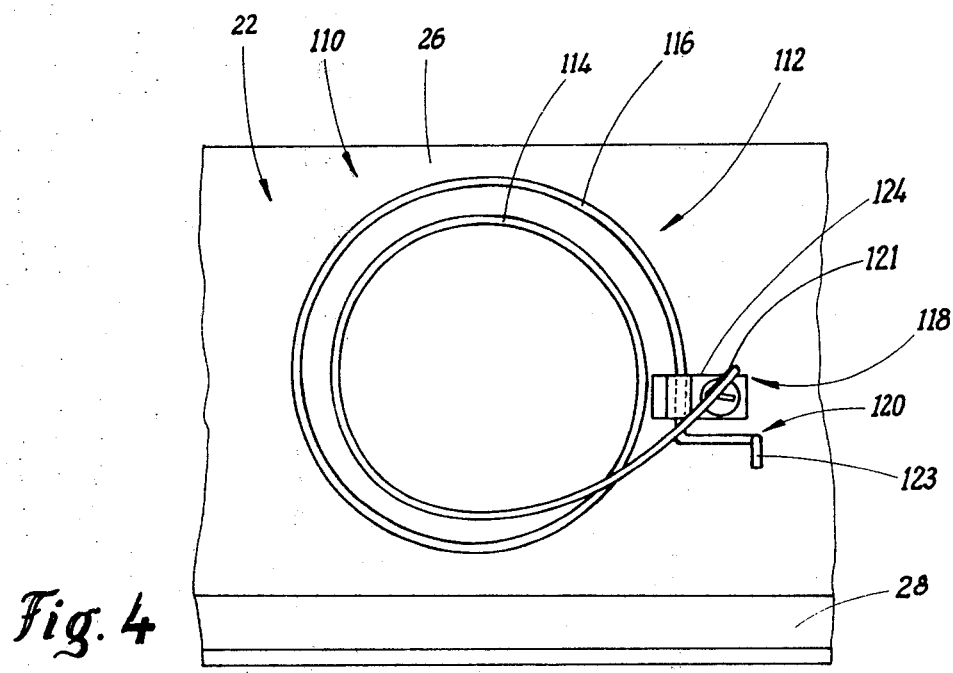
Fig. 4
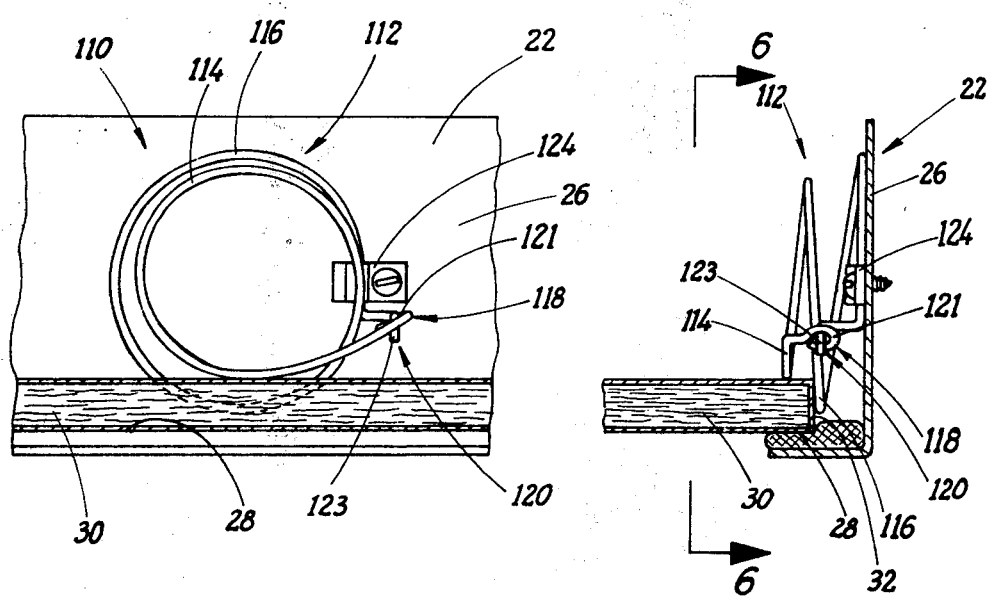
Fig. 6
Fig. 5

FILTER RETAINING LATCH

BACKGROUND OF THE INVENTION

The present invention relates to the field encompassing latches, and more particularly to latches for centering and holding a filter in a housing.

Latches for holding a filter into a housing must be simple to manipulate without the use of tools and be simple in construction, therefore, inexpensive to manufacture, yet be sturdy. Heretofore known, filter retaining latches have by and large failed to satisfy these requirements. Furthermore, the prior art latches frequently include components which when attached to the filter housing project beyond the peripheral confines of the housing thereby subjecting them to damages in shipping and adding to the cost of shipping. In addition, the prior latches do not provide means for locating the filter in the housing making it possible to latch a filter in the housing in mismatched relationship to the flow path of fluid to be filtered thereby, in many applications, decreasing the efficiency of the filter.

Therefore, a need exists for inexpensive, sturdy filter latch which is manipulative without the use of tools and which includes means for properly locating the filter in the housing.

SUMMARY OF THE INVENTION

The present invention is a latch for locating and holding a filter in a filter housing which satisfies the above-mentioned needs. The latch is a coil of elastic material having a filter retaining turn which exerts a force of the filter thereby urging the filter into sealing engagement with the housing and means for locating the filter in the housing.

More specifically, one construction of the present invention is a coiled latch for locating and holding a filter in a housing, comprising: a filter retaining turn, a free end, a fixed end and means for locating the filter in the housing; the coiled latch is to be attached to the housing such that the filter retaining turn is spaced a distance from the housing smaller than the thickness of the filter, and when the filter is positioned in the housing and received in the space it exerts a force on the filter retaining turn deforming the filter retaining turn and displacing the free end generally radially inwardly of the coil, thus, causing the retaining turn to exert a counter force against the filter thereby holding the filter in the housing.

Another construction of the present invention is a elastic coiled latch for locating and holding a filter in a housing, comprising: a filter retaining turn, a free end adapted to be moved between a first free position and a second filter retaining position spaced generally radially outwardly of the coil from the first position, and a fixed end; means for locating the filter in the housing; means for selectively connecting the free end and the fixed end of the coil together when the free end is in the second position; and the coiled latch being adapted to be attached to the housing such that the retaining turn is spaced a distance from the housing greater than the width of the filter when the free end is in the first position, and when the free end is in the second filter retaining position the retaining turn is in abutment with the filter thereby retaining the filter in the housing.

DESCRIPTION OF THE DRAWINGS

A better understanding of the invention will be had upon reference to the accompanying drawings in which like numerals refer to like parts throughout the several views and in which:

FIG. 1 is a front view of one construction of a coiled latch of the present invention attached to a filter frame, only a fragmented portion of the frame being shown.

FIG. 2 is a side view of the latch of FIG. 1, but showing a filter in place;

FIG. 3 is a view taken in direction of arrows 3—3 of FIG. 2;

FIG. 4 is a front view of another construction of the coiled latch of the present invention attached to a filter frame, only a fragmented portion of the frame being shown;

FIG. 5 is a side view of the latch of FIG. 4, but showing a filter in place; and FIG. 6 is a view taken in the direction of arrows 6—6 of FIG. 5.

DESCRIPTION OF THE PREFERRED EMBODIMENT

Referring to FIGS. 1-3, there is shown a coiled filter latch 10 of an elastic material, such as a spring steel wire. The coiled latch 10 includes at least two turns generally in the form of a conical helix. The smaller turn 14 is a filter retaining turn and the larger turn 16 is a filter locating turn. The end of coil contiguous with the filter retaining turn 14 is a free end 18, while the other end of the coil contiguous to the filter locating turn 16 is a fixed end 20.

The coiled latch 10 is adapted to be connected to a filter housing 22 by means of a fastener 24 which clamps the fixed end 20 of the coiled latch 10 to a flange 26 of the filter housing 22. As can best be seen with reference to FIGS. 1 and 2, the latch is connected to the filter housing 22 such that the filter retaining turn 14 is laterally spaced from a filter mounting surface 28 of the filter housing 22 by a distance smaller than the thickness of a filter 30 to be positioned in the housing 22. In practice, a plurality of latches 10 are preferably spaced around the housing 22 to engage the filter as various peripheral locations.

Referring to FIGS. 2 and 3, the filter 30 is positioned in the housing 22 in the space between the filter retaining turn 14 and the filter mounting surface 28. As the filter 30 is inserted in the above-defined space, the peripheral margin 32 of the filter 30 abuts the filter locating turn 16, thus, properly locating the filter 30 in the housing 22. In addition, the filter 30 exerts a force on the filter retaining turn 14, which due to the geometric turn construction of the coiled latch 10 allows it to deform, displacing the free end 18 generally radially inwardly of the coil 12 and causing the retaining turn 14 to exert a counter force against the filter 30 forcing it into a sealing relationship with the filter mounting flange 28 of the housing 22. The relative positions of the free end 18 and retaining turn 14 with and without the filter 30 in place can clearly be seen by comparing FIGS. 1 and 2.

Now turning to FIGS. 4-6, there is shown another construction of the preferred embodiment in the form of a coiled latch 110 which comprises at least two turns generally in the form of a conical helix. The smaller turn 114 is a filter retaining turn and the larger turn 116 is a filter locating turn. The end of the coil contiguous to the retaining turn 114 is a free end 118 and the other end of the coil contiguous with the filter locating turn 116 is a fixed end 120. The free end 118 is adapted to be moved between a first or free position (see FIG. 4) to a second or filter retaining position (see FIGS. 5 and 6) spaced generally radially outwardly from the first position. As illustrated, the free end 118 is formed in the shape of a loop 121 and the fixed end 120 with a hook 123.

The coiled latch 110 is adapted to be secured to the filter housing 22 by means of a fastener 124 which attaches the fixed end 120 to the flange 26 of the housing 22. As can best be seen by comparing FIGS. 4 and 6, the latch 110 is attached to the housing 22 such that when the free end 118 is in the free position (see FIG. 4) the filter retaining turn 114 is spaced a distance from the filter mounting surface 28 a distance greater than the width of the filter 30.

As can best be seen in FIGS. 5 and 6, when the filter 30 is positioned in the housing 22 its peripheral margin 32 abuts the filter locating turn 116, thus, properly locating it in the housing. The free end 118 is manually moved generally radially outwardly of the coil 112 and toward the filter 30 from the first or free position (see FIG. 4) to the second or filter retaining position (see FIGS. 5 and 6) causing the retaining turn 114 to move into abutment with the filter 30. The free end 118 is connected to the fixed end 120 by engaging the hook 123 into the loop 121. Thus, the filter retaining turn 114 exerts a force on the filter 30 urging it into sealing relationship with the filter mounting surface 28 of the housing 22.

The foregoing detailed descriptions are given primarily for clearness of understanding and no unnecessary limitations should be understood therefrom for modifications will be obvious to those skilled in the art upon reading this disclosure and may be made without departing from the spirit of the invention or the scope of the appended claims.

What is claimed is:

1. A coiled latch for locating and holding a filter in a housing, said coiled latch comprising:
    a generally radially displaceable filter retaining turn adapted to be laterally spaced from the housing a distance greater than the thickness of the filter, said retaining turn having a free end adapted to be moved between a first free position and a second filter retaining position spaced generally radially outwardly from the axis of said retaining turn from said first position;
    a filter locating turn coaxially disposed to and integral with said filter retaining turn, said locating turn having a larger radii than said retaining turn, said locating turn having a fixed end, said locating turn being adapted to be attached to the housing proximate said fixed end;
    a hook formed in the end of one of said turns; and
    a loop formed in the end of the other of said turns, said loop being adapted to receive said hook when said free end is in said second filter retaining position;
    whereby when the filter is positioned in the housing in the space between the housing and said filter retaining turn, the peripheral margin of the filter axially abuts said locating turn and said free end is in said second position and attached to said fixed end, said retaining turn exerts a radially directed force on the filter thereby holding the filter in the housing.

2. The clamp as defined in claim 1, wherein:
    said hook is formed in the free end of said filter retaining turn; and,
    said loop is formed in the fixed end of said filter locating turn.

* * * * *